United States Patent Office 3,560,525
Patented Feb. 2, 1971

3,560,525
5-PHENYL-2-FURANACETIC ACIDS, 5-PHENYL-2-THIOPHENEACETIC ACIDS, AND THEIR DERIVATIVES
James S. Kaltenbronn, Ann Arbor, Mich., assignor to Parke, Davis & Company, Detroit, Mich.
No Drawing. Continuation-in-part of application Ser. No. 598,912, Dec. 5, 1966. This application Oct. 13, 1967, Ser. No. 675,036
Int. Cl. C07d 63/12, 5/16; A61b 27/00
U.S. Cl. 260—332.2                                    5 Claims

ABSTRACT OF THE DISCLOSURE 5-phenyl-2-furanacetic acids, 5-phenyl-2-thiopheneacetic acids, and salts, lower alkyl ester and lower dialkylaminoalkyl esters thereof, in which the phenyl group is optionally substituted by m-halo, p-halo, m-methyl, p-methyl, m-methoxyl, and p-methoxyl, useful as pharmacological agents exhibiting anti-inflammatory activity; and their production by (a) hydrolyzing an appropriately substituted compound having a group hydrolyzable to a carboxyl group, such as, for example, 5-phenyl-2-furanacetonitrile or 5-phenyl-2-thiopheneacetonitrile, (b) reacting the hydrazone of an appropriately substituted heterocyclic glyoxylic acid compound with a base, and (c) esterifying the free acid compounds of the invention to give the esters of the invention.

---

This application is a continuation-in-part of copending application Ser. No. 598,912, filed Dec. 5, 1966, now abandoned.

SUMMARY AND DETAILED DESCRIPTION

The present invention relates to new 5-phenyl-2-furanacetic acid compounds, to new 5-phenyl-2-thiopheneacetic acid compounds, and to salts and esters of these acid compounds. More particularly, the invention relates to new chemical compounds having the formula

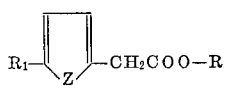

and to methods for their production; where R represents hydrogen, a salt-forming cation, a lower alkyl radical, or a lower dialkylaminoalkyl radical; $R_1$ represents phenyl, m-halophenyl, p-halophenyl, m-tolyl, p-tolyl, m-anisyl, or p-anisyl; and Z is oxygen or sulfur. The lower dialkylaminoalkyl radical can be present in free base or acid-addition salt form.

In the foregoing formula the lower alkyl radicals are preferably those containing not more than four carbon atoms. The lower dialkylaminoalkyl radicals, which can be represented by the formula, $$-\text{alkylene}-\text{N} \diagup \diagdown \begin{array}{c} \text{lower alkyl} \\ \text{lower alkyl} \end{array}$$

are preferably those in which each lower alkyl group contains not more than four carbon atoms, and the alkylene group also contains not more than four carbon atoms, separating the groups to which it is attached by at least two carbon atoms.

In accordance with the invention, compounds having the formula

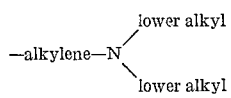

are produced by hydrolyzing a compound having the formula

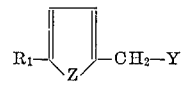

where $R_1$ and Z are as earlier defined; M is hydrogen or a salt-forming cation; and Y is a group hydrolyzable to a carboxyl group. Some examples of groups hydrolyzable to a carboxyl group are cyano, alkoxycarbonyl, aryloxycarbonyl, aralkoxycarbonyl, carbamoyl, alkyl-substituted carbamoyl, trihalomethyl, amidino, alkyl-substituted amidino, haloformyl,

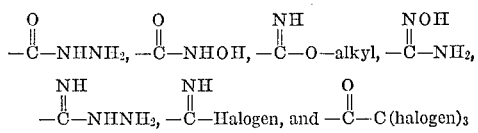

The precise nature of the group Y which is hydrolyzable to a carboxyl group is not critical because in carrying out the process it is converted to a carboxyl group. Therefore, if desired, the group Y can in appropriate cases contain one or more substituents such as lower alkyl, lower alkoxy, halogen, nitro, carboxy, or alkoxycarbonyl, and in those cases where the group Y is basic, it can also be employed in the form of an acid-addition salt. As used herein the term "group hydrolyzable to a carboxyl group" designates substituted as well as unsubstituted radicals. Compounds in which the group Y is the cyano group are preferred starting materials in the process because they are quite readily available and are hydrolyzable to the carboxyl derivatives in high yields.

The hydrolysis can be carried out under either acidic or alkaline conditions, by the use of an acidic or basic hydrolytic agent. Alkaline conditions are preferred and should be used exclusively with certain of the Y groups, for example, with the

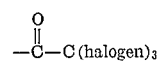

group. The hydrolysis can be carried out in water or in an aqueous solution of an unreactive, water miscible, organic solvent such as an aliphatic alcohol, dioxane, tetrahydrofuran, ethylene glycol, propylene glycol or a lower alkyl ether of ethylene glycol or of diethylene glycol, to which has been added an acid or a base to render the medium acidic or alkaline. Some examples of suitable bases are alkali metal hydroxides, alkaline earth metal hydroxides, alkali metal carbonates, alkali metal alkoxides, and trialkylammonium hydroxides. Some examples of suitable acids are mineral acids, strong organic acids such as p-toluenesulfonic acid, and acidic ion exchange resins. Preferred agents are alkali metal hydroxides such as sodium hydroxide or potassium hydroxide. The hydrolytic agent is normally employed in a considerable excess.

The hydrolysis is carried out by heating a solution or suspension of the starting material in a solvent medium containing an acid or a base until hydrolysis of the group Y is substantially complete. The required time and temperature will vary depending on the nature of the specific starting material of Formula III that is employed and on the basic or acidic agent used. In general, however, the reaction is carried out at a temperature between about 30° and 200° C., or at the reflux temperature of the solvent, with a reaction time of from one to 48 hours. When an acidic hydrolytic agent is used with a starting compound of Formula III wherein Z is oxygen, the temperature and time of the reaction are preferably chosen at the low end of these ranges so as to avoid fission of the furan ring. When using one of the preferred basic hydrolytic agents the reaction is usually carried out at a temperature between 60–125° C., and is substantially complete within less than 24 hours. When the hydrolysis is carried out under alkaline conditions, the product is present in the reaction mixture in the form of a salt; and it can be isolated in this form or, following treatment with an acid, preferably a mineral acid, it can be isolated as the free acid. When the hydrolysis is carried out under acidic conditions, the product is present in the reaction mixture as the free acid and it can be isolated directly in this form or, by subsequent treatment with a base, it can be isolated in salt form.

Starting materials required for use in the foregoing process can be prepared by a variety of methods as illustrated in greater detail hereinafter. For example, the nitrile compounds, that is, the compounds of Formula III wherein Y is cyano, can be conveniently prepared by the following series of reactions. A substituted aniline having the formula

$R_1$—$NH_2$     IV is diazotized by reaction with sodium nitrite and hydrochloric acid, and the intermediate diazonium chloride that is obtained is reacted with a heterocyclic aldehyde compound having the formula

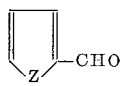     V to give a substituted heterocyclic aldehyde compound having the formula

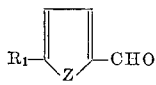     VI

The aldehyde compound of Formula VI is reduced by reaction with lithium aluminum hydride, the resulting substituted heterocyclic carbinol compound having the formula

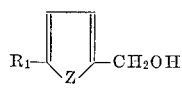     VII is treated with phosphorus tribromide, and the bromide compound that is obtained, having the formula,

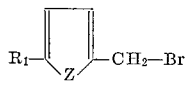     VIII is reacted with sodium cyanide to produce the desired nitrile starting material. In Formulas IV, V, VI, VII, and VIII above, $R_1$ and Z have the aforementioned significance.

Also in accordance with the invention, compounds having Formula II above are produced by reacting the hydrazone of a heterocyclic glyoxylic acid compound, said hydrazone having the formula,

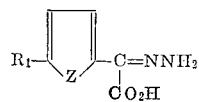     IX with a base; where $R_1$ and Z have the same meaning as previously given. Although a solvent is not strictly required, the reaction is most advantageously carried out in an unreactive solvent medium. Some examples of suitable solvents are higher alkanols, such as amyl alcohol and octanol; benzyl alcohol; alkylene glycols, such as ethylene glycol and propylene glycol; polyalkylene glycols, such as diethylene glycol and triethylene glycol; and dimethyl sulfoxide. Ethylene glycol is a preferred solvent for carrying out the reaction at an elevated temperature, whereas dimethyl sulfoxide is the solvent of choice for reaction at or about room temperature. Bases that may be used include alkali metal hydroxides, such as sodium hydroxide and potassium hydroxide, and alkali metal alkoxides, such as sodium methoxide, sodium ethoxide, and potassium tert-butoxide. Alkali metal hydrides, such as sodium hydride, may also be used when the reaction is carried out in a non-hydroxylic solvent. The preferred base for use with the preferred glycol solvent is potassium hydroxide. For use with dimethyl sulfoxide in the low temperature reaction, potassium tert-butoxide is preferred. The reaction is normally carried out at a temperature in the range of 100° to 250° C. for a period that may vary from one to about 12 hours. The preferred temperature range is 180° to 210° C., and the preferred reaction time is 3 to 6 hours. As already stated, when dimethyl sulfoxide is used as solvent and potassium tert-butoxide is used as base, the reaction can be carried out at about room temperature, during a period that may vary from 30 minutes to 10 hours and longer. Under all conditions, the amount of base must be sufficient to neutralize the carboxylic acid functionality of the hydrazone starting material as well as to catalyze the reaction described above. It is not critical how much base is used above the amount required for neutralization of the acid function. When reaction is complete, the product is present in the reaction mixture in the form of a salt. It can be isolated directly in this form, or following treatment with an acid, preferably a mineral acid, it can be isolated as the free acid.

The hydrazone starting material having Formula IX above is preferably prepared in situ and reacted further without isolation. It is prepared by reacting a heterocyclic glyoxylic acid compound having the formula,

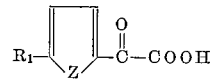     X with hydrazine in one of the solvents listed above; where $R_1$ and Z are as previously defined. For this purpose, the hydrazine is most conveniently used as an aqueous solution of the hydrate. Thus, in a preferred embodiment of the foregoing process of the invention, an aqueous solution of hydrazine hydrate is added to a mixture consisting of the glyoxylic acid starting material, the chosen base, and the preferred glycol solvent, the resulting mixture is slowly distilled to remove water and any excess hydrazine, and the final reaction mixture, containing the hydrazone compound of Formula IX and base, is heated at about 180°–210° C. until reaction is complete (3 to 6 hours). When the reaction of hydrazone with base is carried out at or about room temperature in dimethyl sulfoxide with potassium tert-butoxide as the base, however, best results are obtained when the reaction is carried out starting with the isolated and dried hydrazone compound.

The heterocyclic glyoxylic acid compounds used in the foregoing process can be prepared by reacting a substituted furan or thiophene compound having the formula

     XI with ethyl oxalyl chloride in the presence of stannic chloride, and then hydrolyzing the resulting heterocyclic glyoxylic acid, ethyl ester, having the formula,

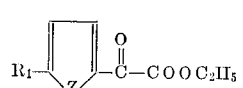     XII by reaction with aqueous base; where $R_1$ and Z have the aforementioned significance.

Further in accordance with the invention, compounds having the formula,

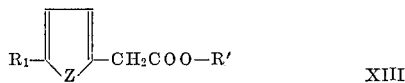
XIII are produced by reacting a compound having the formula,

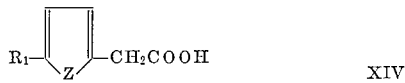
XIV or a reactive derivative thereof, with a lower alkanol, a lower dialkylaminoalkanol, or a reactive derivative of these; where R' is lower alkyl or lower dialkylaminoalkyl and $R_1$ and Z are as defined previously. The lower alkanol, lower dialkylaminoalkanol, and their reactive derivatives serve as esterifying agents. Some examples of suitable reactive derivatives of the acid are the acid anhydride, acid halides, and alkali metal salts of the acid. Some examples of suitable reactive derivatives of the alkanols are various esters such as methyl bromide, methyl iodide, ethyl iodide, propyl iodide, dimethyl sulfate, diethyl sulfate, 2-diethylaminoethyl chloride, 2-dipropylaminoethyl chloride, and 3-diethylaminopropyl bromide. Other reactive derivatives such as diazomethane can also be used.

When the esterifying agent is a lower alkanol or a lower dialkylaminoalkanol, the process is preferably carried out by heating the free acid or the anhydride or halide with an excess of the lower alkanol or lower dialkylaminoalkanol. An acidic catalyst such as hydrogen chloride, sulfuric acid, or benzenesulfonic acid is used when the free acid or the anhydride is one of the reactants. Additional solvents such as tetrahydrofuran, benzene, dioxane or diethylene glycol dimethyl ether may be present but are not necessary. The reaction is commonly carried out at a temperature of about 25° C. or higher, preferably at 60–150° C. but not higher than the reflux temperature, and is normally completed within 5 to 100 hours with the free acid or within 1 to 5 hours with the anhydride or a halide.

When the esterifying agent is an ester of a lower alkanol or an ester of a lower dialkylaminoalkanol as illustrated above, the process is preferably carried out by heating the acid or salt thereof with the selected halide, sulfate, or other ester derivative in a solvent and in the presence of a base. Some examples of suitable solvents are lower alkanols, tetrahydrofuran, dioxane, dimethylformamide, diethylene glycol dimethyl ether, and mixtures thereof. Some examples of suitable bases are inorganic alkalies and tertiary organic amines. At least one equivalent and preferably an excess of the esterifying agent is used. The reaction is usually carried out at a temperature from 25–150° C., preferably from 50–100° C., and under these conditions it is substantially complete within one hour.

When the esterifying agent is diazomethane, the process is preferably carried out in an unreactive solvent such as ether, tetrahydrofuran, diethylene glycol dimethyl ether or dioxane. The reaction proceeds very rapidly and is preferably carried out by treating the free acid with one equivalent or a slight excess of diazomethane at 0 to 25° C., under which conditions the esterification is complete within less than 5 minutes.

For the esterification of the compounds of Formula XIV wherein Z is oxygen, reaction under basic conditions is highly preferred because of the sensitivity of the furan ring to acid.

In the case of the production of the lower dialkylaminoalkyl esters of the invention, the product can be isolated, by pH adjustment, either as the free base or as an acid-addition salt.

The free acids and the free bases of the invention form salts with a variety of organic or inorganic bases or acids. Some examples of suitable bases are sodium hydroxide, potassium hydroxide, calcium hydroxide, aluminum hydroxide, sodium carbonate, potassium bicarbonate, choline, 2-hydroxyethylamine, ammonia, and diethylamine. Some examples of suitable acids are hydrochloric acid, hydrobromic acid, sulfuric acid, phosphoric acid, acetic acid, citric acid, tartaric acid and sulfamic acid. The preferred carboxylate salts of the invention are the pharmaceutically-acceptable salts of an alkali metal, an alkaline earth metal, ammonia, or a substituted ammonia. Preferred acid-addition salts of the invention are the mineral acid salts. The carboxylate salts and acid-addition salts with pharmaceutically-acceptable cations and anions differ in solubility properties from the free acids and free bases but are otherwise equivalent for the purposes of the invention.

The compounds of the invention are new chemical compounds that are useful as pharmacological agents, especially as anti-inflammatory agents. As such, they are of value in mitigating the symptoms associated with inflammatory conditions as well as in preventing or suppressing the occurrence of inflammation. Their anti-inflammatory activity is demonstrable and quantitatively measurable by means of a test designed to measure the ability of a test compound to delay the normal appearance of an erythema in animals exposed to ultraviolet radiation under standardized conditions. The test procedure that is used has been described in Archives Internationales de Pharmacodynamie et de Therapie, vol. 116, pages 261–292, 1958. This test has been found to be a reliable indicator of anti-inflammatory activity, as demonstrated, for example, for the known clinically useful agents, aminopyrine, antipyrine, and aspirin. In this standard test procedure, 5-phenyl-2-thiopheneacetic acid, the compound of Example 4 herein, and 5-(p-chlorophenyl)-2-furanacetic acid, the compound of Example 2 herein, were each found to be effective at a dose of 3.1 mg./kg.

The compounds of the invention are preferably administered by the oral route, although parenteral administration can also be used. They can be employed in either free acid, ester, or salt form, and can be combined with either a solid or liquid carrier or diluent and made available in varying amounts in such pharmaceutical forms as tablets, capsules, powders, and aqueous and non-aqueous suspensions and solutions.

The invention is illustrated by the following examples.

EXAMPLE 1

A solution of 4.6 g. of potassium hydroxide in 25 ml. of water is added to a solution of 4.6 g. of 5-phenyl-2-furanacetonitrile in 100 ml. of ethanol, and the resulting mixture is heated under reflux for 6 hours and then evaporated under reduced pressure. The residue is dissolved in water, the aqueous solution is washed three times with ether, acidified with dilute hydrochloric acid, and the acidified mixture is extracted with ether. The ethereal solution is washed with water, dried, and evaporated under reduced pressure to give 5-phenyl-2-furanacetic acid, which is isolated and purified by chromatography on silica gel and crystallization from benzene-hexane; M.P. 126–128° C.

To a solution of 2.02 g. of 5-phenyl-2-furanacetic acid in 20 ml. of methanol is added exactly 10 ml. of 1.0 N aqueous sodium hydroxide, and the resulting solution is evaporated to dryness under reduced pressure to give 5-phenyl-2-furanacetic acid sodium salt as a white powdery solid.

To a warm solution of 2.24 g. of 5-phenyl-2-furanacetic acid sodium salt in 25 ml. of water is added with stirring a solution of 0.74 g. of calcium chloride dihydrate in 5 ml. of water. The resulting mixture is cooled and the 5-phenyl-2-furanacetic acid calcium salt that precipitates is isolated by filtration and dried.

The 5-phenyl-2-furanacetonitrile used as starting material in the foregoing procedure is prepared as follows.

To a suspension of 2.3 g. of lithium aluminum hydride in 50 ml. of ether is added dropwise a solution of 7.5 g.

of 5-phenyl-2-furaldehyde in 50 ml. of tetrahydrofuran, and the resulting mixture is heated under reflux for 90 minutes, cooled, and treated successively with ethyl acetate and with water. The organic phase is separated and the inorganic residue is extracted several times with ether. The separated organic phase and ether extract are combined, washed with saturated aqueous sodium chloride, dried and evaporated under reduced pressure to give 5-phenyl-2-furfuryl alcohol; M.P. 62.5–63° C., following crystallization from benzene-hexane.

To a solution of 4.9 g. of 5-phenyl-2-furfuryl alcohol in 65 ml. of ether, cooled to 0–5° C., is added dropwise a solution of 2.8 g. of phosphorus tribromide in 20 ml. of ether. The resulting mixture is stirred at room temperature for 90 minutes, and the supernatant ether solution is isolated by decantation, washed with 50% aqueous sodium hydroxide, dried and evaporated under reduced pressure at room temperature to give 2-(bromomethyl)-5-phenylfuran, which is suitable for use without further purification and should be reacted further without delay because it is unstable under normal conditions. This product is dissolved in 50 ml. of acetone, a solution of 1.5 g. of sodium cyanide in 10 ml. of water is added, and the resulting mixture is stirred at 0–5° C. for 30 minutes, and then, following dilution with 50 ml. of ethanol, is heated under reflux for 3 hours and evaporated to dryness under reduced pressure. The residue is extracted with ether, and the ether extract is washed with water, dried, and evaporated under reduced pressure to give 5-phenyl-2-furanacetonitrile, obtained as a viscous oil that is suitable for use without further purification.

EXAMPLE 2

A solution of 12.5 g. of potassium hydroxide in 50 ml. of water is added to a solution of 12.5 g. of 5-(p-chlorophenyl)-2-furanacetonitrile in 200 ml. of ethanol, and the resulting mixture is heated under reflux for 6 hours and then evaporated under reduced pressure. The residue is dissolved in water, the aqueous solution is washed three times with ether, acidified with dilute hydrochloric acid, and the acidified mixture is extracted with ether. The ethereal solution is washed with water, dried, and evaporated under reduced pressure to give 5-(p-chlorophenyl)-2-furanacetic acid; M.P. 146.5–148.5° C., following crystallization from benzene.

To a solution of 2.37 g. of 5-(p-chlorophenyl)-2-furanacetic acid in 20 ml. of methanol is added 10 ml. of 1.0 N aqueous potassium hydroxide, and the resulting solution is evaporated to dryness under reduced pressure to give 5-(p-chlorophenyl)-2-furanacetic acid potassium salt as a white solid.

A solution of 1.40 g. of choline chloride in 10 ml. of methanol is added to a warm, stirred solution of 2.59 g. of 5-(p-chlorophenyl)-2-furanacetic acid potassium salt in 25 ml. of methanol. The mixture is stirred for one hour, chilled, the insolubue potassium chloride is removed by filtration, and the filtrate is evaporated to dryness under reduced pressure to give 5-(p-chlorophenyl)-2-furanacetic acid chlorine salt as a white solid.

The 5-(p-chlorophenyl)-2-furanacetonitrile starting material is obtained starting from 5-(p-chlorophenyl)-2-furfuryl alcohol by reaction with phosphorus tribromide followed by treatment of the intermediate 2-(bromomethyl)-5-(p-chlorophenyl)furan product with sodium cyanide according to procedures described in Example 1 above for the preparation of 2-(bromomethyl)-5-phenyl-furan and 5-phenyl-2-furanacetonitrile.

EXAMPLE 3

By utilizing the procedure described in Examples 1 and 2 above, the following compounds are obtained from the basic hydrolysis of the designated heterocyclic acetonitrile compounds:

(a) 5-(m-chlorophenyl)-2-furanacetic acid, M.P. 109–110° C., following sublimation at 70–90° C./0.2 mm. Hg and crystallization of the sublimate from benzene-hexane; from reaction of 11.0 g. of 5-(m-chlorophenyl)-2-furanacetonitrile in 250 ml. of ethanol with a solution of 11.0 g. of potassium hydroxide in 50 ml. of water.

(b) 5-(p-fluorophenyl)-2-furanacetic acid, M.P. 116–117.5° C., following crystallization from a hot charcoal-treated benzene solution; from reaction of 9.0 g. of 5-(p-fluorophenyl)-2-furanacetonitrile in 200 ml. of ethanol with a solution of 9.0 g. of potassium hydroxide in 40 ml. of water.

(c) 5-(p-bromophenyl)-2-furanacetic acid, M.P. 162–164° C., following several crystallizations from benzene; from reaction of 17.0 g. of 5-(p-bromophenyl)-2-furanacetonitrile in 500 ml. of ethanol and 300 ml. of dioxane with a solution of 17.0 g. of potassium hydroxide in 80 ml. of water.

(d) 5-phenyl-2-thiopheneacetic acid, M.P. 142–144° C., following two crystallizations from benzene-hexane; from reaction of 10 g. of 5-phenyl-2-thiopheneacetonitrile in 200 ml. of ethanol with a solution of 10 g. of potassium hydroxide in 50 ml. of water.

(e) 5-(p-tolyl)-2-furanacetic acid, M.P. 143–144° C., following crystallization from benzene-hexane; from reaction of 11.3 g. of 5-(p-tolyl)-2-furanacetonitrile in 300 ml. of ethanol with a solution of 11.3 g. of potassium hydroxide in 50 ml. of water.

(f) 5-(p-anisyl)-2-furanacetic acid, M.P. 143–145.5° C., following sublimation at 138° C. and 0.3 mm. Hg and crystallization from benzene-hexane; from reaction of 14.8 g. of 5-(p-anisyl)-2-furanacetonitrile in 300 ml. of ethanol with a solution of 14.8 g. of potassium hydroxide in 60 ml. of water.

(g) 5-(m-anisyl)-2-furanacetic acid; from reaction of 13 g. of 5-(m-anisyl)-2-furanacetonitrile in 300 ml. of ethanol with a solution of 13 g. of potassium hydroxide in 50 ml. of water.

The preparation of the heterocyclic acetonitrile compounds required as starting materials can be illustrated by the preparation of 5 - (m-chlorophenyl)-2-furanacetonitrile according to the following procedure.

To a stirred mixture consisting of 63.8 g. of m-chloroaniline, 135 ml. of concentrated hydrochloric acid, and 50 ml. of water, kept below 10° C., is added dropwise a solution of 36.2 g. of sodium nitrite in 100 ml. of water, and the resulting solution is stirred at 10° C. for 10 minutes, and is then added all at once to a solution of 61.5 g. of 2-furaldehyde in 200 ml. of water. A solution of 23 g. of cupric chloride dihydrate in 100 ml. of water is added, and the resulting mixture is heated at 50–65° C. for 4 hours and then kept at room temperature for 16 hours. The mixture is then subjected to steam distillation to remove steam-volatile material and the non-volatile residue is extracted with ether. The ether extract is washed twice with 5% aqueous sodium hydroxide, then with water until neutral, dried, treated with charcoal, filtered, and evaporated to give 5-(m-chlorophenyl)-2-furaldehyde; M.P. 97.5–98° C., following crystallization from ethanol. This furaldehyde intermediate is reduced by reaction with lithium aluminum hydride, the 5-(m-chlorophenyl)-2-furfuryl alcohol product is reacted with phosphorus tribromide to give 2-(bromomethyl)-5-(m-chlorophenyl)furan, which is treated with sodium cyanide to give the desired 5 - (m - chlorophenyl) - 2 - furanacetonitrile, obtained as an oil that is suitable for use without further purification, utilizing procedures described in Example 1 above for analogous reactions.

EXAMPLE 4

A solution of 4.4 g. of 5-phenyl-2-thiopheneglyoxylic acid in 32 ml. of diethylene glycol is treated with 3.0 ml. of 85% hydrazine hydrate and 4.2 g. of potassium hydroxide, and the resulting mixture is distilled to remove water and then heated to 200° C. and kept at that temperature for 4 hours. Upon cooling, the mixture is poured into an equal volume of water, the aqueous mixture is acidified with dilute hydrochloric acid, and the 5-phenyl-2-thiopheneacetic acid that precipitates is isolated, washed with water, and dried; M.P. 142–144° C., following two crystallizations from benzene-hexane.

A solution of 2.2 g. of 5-phenyl-2-thiopheneacetic acid in 25 ml. of methanol is treated with 5 ml. of concentrated aqueous ammonium hydroxide, and the resulting solution is evaporated to dryness under reduced pressure to give 5-phenyl-2-thiopheneacetic acid ammonium salt as a white solid. The diethylamine salt is prepared similarly by substituting 1.0 g. of diethylamine for the ammonium hydroxide.

To a solution of 2.17 g. of 5-phenyl-2-thiopheneacetic acid in 20 ml. of methanol is added exactly 10 ml. of 1.0 N aqueous sodium hydroxide, and the resulting solution is evaporated to dryness under reduced pressure to give 5-phenyl-2-thiopheneacetic acid sodium salt as a white solid.

By utilizing the foregoing procedure, the following compounds are obtained by reacting the designated glyoxylic acid compound with hydrazine hydrate and base:

(a) 5-(p-anisyl)-2-thiopheneacetic acid; from reaction of 5-(p-anisyl)-2-thiopheneglyoxyclic acid with hydrazine hydrate and potassium hydroxide and acidification of the reaction product with hydrochloric acid.

(b) 5-(m-tolyl)-2-thiopheneacetic acid; from reaction of 5-(m-tolyl)-2-thiopheneglyoxylic acid with hydrazine hydrate and potassium hydroxide and acidification of the reaction product with hydrochloric acid.

(c) 5-phenyl-2-furanacetic acid, M.P. 126–128° C., following crystallization from benzene-hexane; from reaction of 5-phenyl-2-furanglyoxylic acid with hydrazine hydrate and potassium hydroxide and acidification of the reaction product with hydrochloric acid.

The preparation of the glyoxylic acid compounds required above as starting materials can be illustrated by the preparation of 5-phenyl-2-thiophereglyoxylic acid according to the following procedure.

A stirred mixture consisting of 10.0 g. of 2-phenylthiophene, 8.54 g. of ethyl oxalyl chloride, and 50 ml. of benzene is cooled to 5–10° C. while 16.3 g. of stannic chloride is added dropwise. After 15 minutes more at 5–10° C., the resulting mixture is allowed to warm to room temperature over a period of 30 minutes, and is then poured into excess dilute hydrochloric acid. The acidic mixture is extracted with ether, and the ether extract is washed successively with water, with saturated aqueous sodium bicarbonate, and again with water until neutral, dried, and evaporated under reduced pressure to give the ethyl ester of 5-phenyl-2-thiopheneglyoxylic acid as an oil, suitable for use without further purification.

A mixture consisting of 12.6 g. of the ethyl ester of 5-phenyl-2-thiopheneglyoxylic acid, 5.45 g. of potassium hydroxide, 200 ml. of ethanol, 50 ml. of water, and 25 ml. of dioxane is heated under reflux for one hour and then evaporated under reduced pressure to remove solvent. The residue is acidified with dilute hydrochloric acid, the acidic mixture is extracted with ether, and the ether extract is washed well with water, dried, and evaporated to give the desired 5-phenyl-2-thiopheneglyoxylic acid; M.P. 161–164° C., following crystallization from ethyl acetate-hexane.

EXAMPLE 5

A solution of 5.0 g. of 5-phenyl-2-thiopheneacetic acid in 50 ml. of absolute ethanol containing 5 ml. of concentrated hydrochloric acid is heated under reflux for 4 hours, evaporated under reduced pressure, and the residue is dissolved in ether. The ether solution is washed successively with water, with saturated aqueous sodium bicarbonate, and with water again, dried, and evaporated to yield the ethyl ester of 5-phenyl-2-thiopheneacetic acid.

EXAMPLE 6

A stirred suspension consisting of 2.0 g. of 5-phenyl-2-furanacetic acid, 75 ml. of methanol, 1.4 g. of potassium carbonate, and 5 ml. of methyl iodide is heated under reflux for two hours, cooled to room temperature, and stirred with an additional 7 ml. of methyl iodide for one hour more. The mixture is then poured into water, the aqueous mixture is extracted with ether, and the ether extract is washed with aqueous sodium bicarbonate and with water, dried and evaporated under reduced pressure to give a residue of the methyl ester of 5-phenyl-2-furanacetic acid.

The same product is obtained by reacting 5-phenyl-2-furanacetic acid with a slight excess of diazomethane in ether at 15° C.

EXAMPLE 7

With stirring, 5 g. of the acid chloride of 5-phenyl-2-thiopheneacetic acid is added slowly to 75 ml. of ethanol. The reaction mixture is cautiously heated to the boiling point, maintained at reflux for one hour, and then evaporated under reduced pressure to give a residue of the ethyl ester of 5-phenyl-2-thiopheneacetic acid.

By utilizing the foregoing procedure, with the substitution of 60 ml. of n-propanol for the ethanol, the product obtained is the n-propyl ester of 5-phenyl-2-thiopheneacetic acid.

The starting material is obtained as follows. 5-phenyl-2-thiopheneacetic acid (10 g.) is added in portions with stirring to 60 ml. of thionyl chloride. When addition is complete, the mixture is cautiously heated to the boiling point and then maintained at reflux for five hours. The excess thionyl chloride is removed by distillation under reduced pressure to yield the acid chloride of 5-phenyl-2-thiophene acetic acid, suitable for use without further purification.

EXAMPLE 8

A mixture consisting of 23.6 g. of 5-(p-chlorophenyl)-2-furanacetic acid, 14.4 g. of 2-dimethylaminoethyl chloride hydrochloride, 20.2 g. of triethylamine, and 100 ml. of N,N-dimethylformamide is stirred and heated at 85–90° C. for 16 hours, cooled, and diluted with ether. Insoluble triethylamine hydrochloride is removed by filtration, and the filtrate is shaken with an excess of dilute hydrochloric acid. The organic phase is discarded, and the acetic aqueous phase is made basic with potassium carbonate and extracted with ether. The ethereal extract is dried and evaporated to dryness to give a residue of the 2-dimethylaminoethyl ester of 5-(p-chlorophenyl)-2-furanacetic acid. The citrate salt is obtained by treating a solution of the basic ester in methanol with a solution of one equivalent of citric acid in methanol. The hydrochloride salt is obtained by treating an ethereal solution of the basic ester with a slight excess of dry hydrogen chloride and isolating and drying the precipitated salt.

By utilizing the foregoing procedure, with the substitution of 21.8 g. of 5-phenyl-2-thiopheneacetic acid for the 5-(p-chlorophenyl)-2-furanacetic acid and 17.2 g. of 2-diethylaminoethyl chloride hydrochloride for the 2-dimethylaminoethyl chloride hydrochloride, the products obtained are the 2-diethylaminoethyl ester of 5-phenyl-2-thiopheneacetic acid and its citrate and hydrochloride salts.

EXAMPLE 9

A solution of 23.7 g. of the acid chloride of 5-phenyl-2-thiopheneacetic acid and 13.1 g. of 3-diethyl-amino-1-propanol in 150 ml. of benzene is kept at room temperature for 18 hours. The mixture is diluted with ether, washed with 0.5 N sodium hydroxide and with saturated sodium chloride solution, dried, and evaporated under reduced pressure to give a residue of the 3-diethylaminopropyl ester of 5-phenyl-2-thiopheneacetic acid. The hydrochloride salt is obtained by dissolving the free base ester in ether and treating the solution with one equivalent of hydrogen chloride.

I claim:

1. A member of the class consisting of heterocyclic acids chosen from among 5-(p-chlorophenyl)-2-furanacetic acid, 5-phenyl-2-furanacetic acid, 5-phenyl-2-thiopheneacetic acid, and 5-(p-anisyl)-2-furanacetic acid;

pharmaceutically-acceptable salts thereof; lower alkyl esters thereof; and lower dialkylaminoalkyl esters thereof.

2. A compound according to claim 1 which is 5-p-chlorophenyl)-2-furanacetic acid.

3. A compound according to claim 1 which is 5-phenyl-2-furanacetic acid.

4. A compound according to claim 1 which is 5-phenyl-2-thiopheneacetic acid.

5. A compound according to claim 1 which is 5-(p-anisyl)-2-furanacetic acid.

References Cited

FOREIGN PATENTS 948,893  2/1964  Great Britain _____ 260—347.4

OTHER REFERENCES

Buu-Hoi et al.: Chem. Abs. 45: 7102–5(9–51).
Mathur et al.: Chem. Abs. 55: 25906–7(12–61).
Cymeman-Craig et al.: Chem. Abs. 59: 9949(10–63).

NORMA S. MILESTONE, Primary Examiner

C. M. SHURKO, Assistant Examiner

U.S. Cl. X.R.

260—329, 332.2, 332.5, 347.3, 347.4, 347.7, 347.8; 424—275, 285